Oct. 23, 1934.  W. M. HANLON  1,978,261
WIRE LINE CLAMP
Filed June 6, 1933  2 Sheets-Sheet 1
Fig-1-
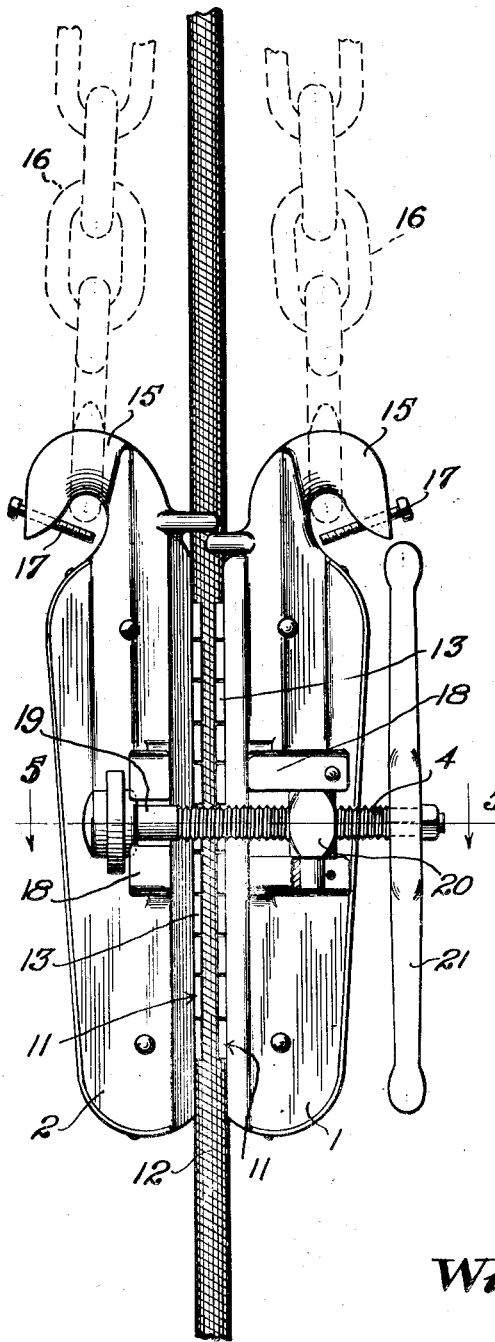
Fig-2-
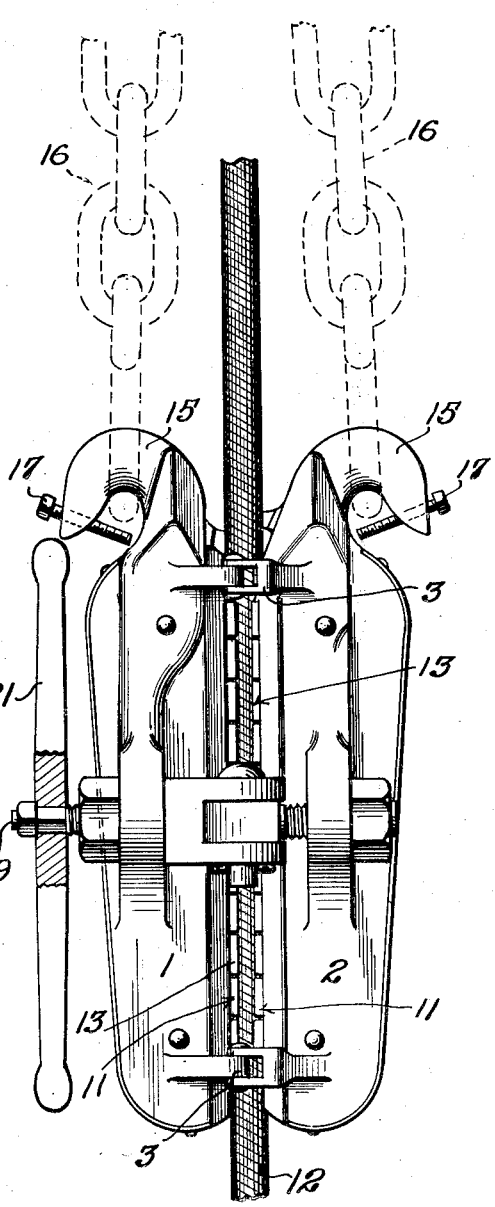
William M. Hanlon,
INVENTOR
BY *Victor J. Evans & Co.*
ATTORNEY

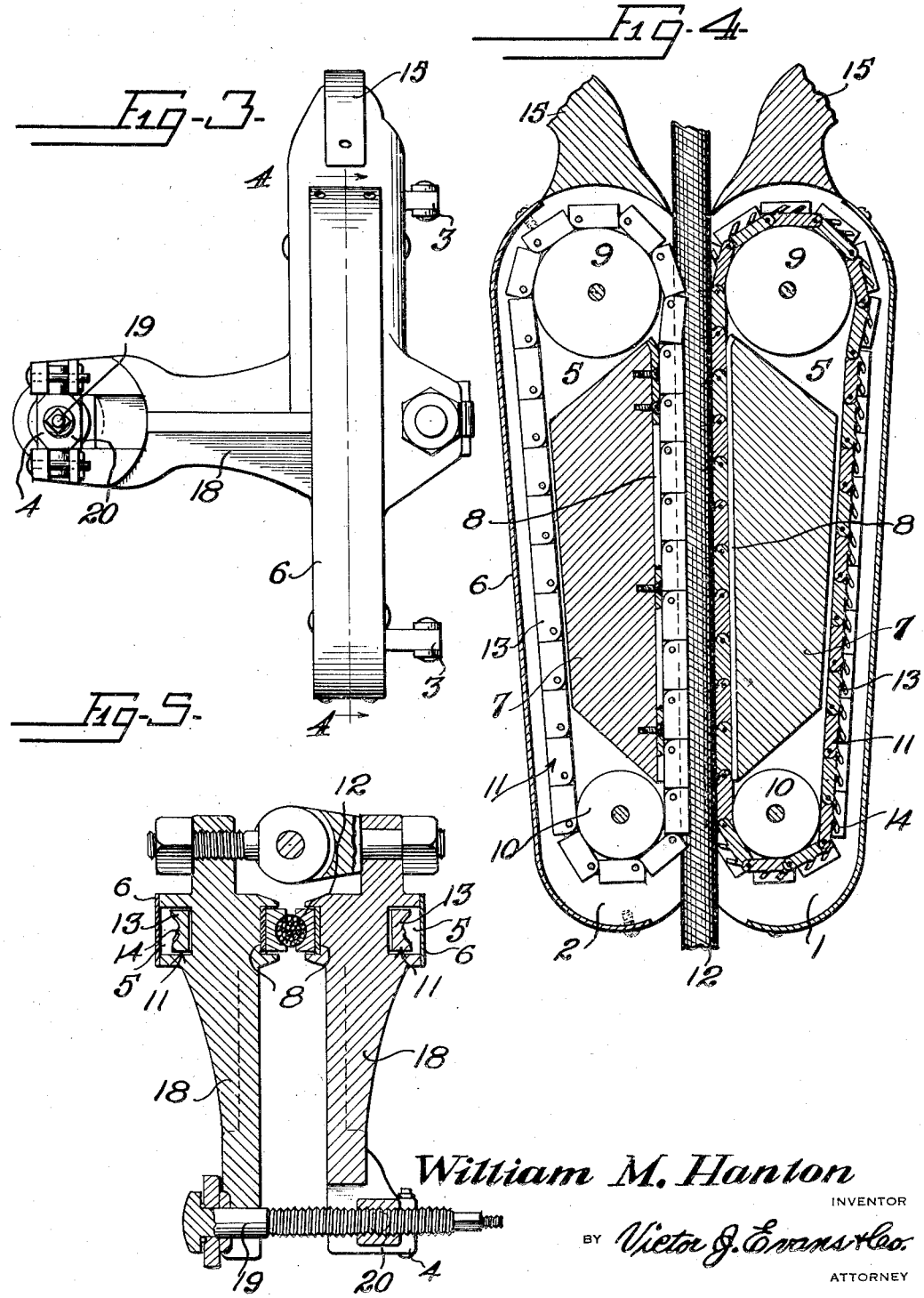

Patented Oct. 23, 1934

1,978,261

UNITED STATES PATENT OFFICE 1,978,261

WIRE LINE CLAMP

William M. Hanlon, Sweetgrass, Mont.

Application June 6, 1933, Serial No. 674,586

1 Claim. (Cl. 24—125)

This invention relates to line or cable clamps and has for the primary object, the provision of movable endless gripping mediums cooperating with each other to firmly grip lines or cables of different sizes and which are so mounted as to permit easy and quick adjustment thereof with respect to the line or cable and the removal of the latter therefrom when desired, and the gripping mediums being of movable endless construction to permit of adjustment of the line or cable without undue wear on the latter or to the gripping mediums and also permit a change of the gripping faces of the gripping mediums to the line or cable during the clamping and releasing of the latter.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a clamp constructed in accordance with my invention.

Figure 2 is a similar view partly in section illustrating the opposite side of the clamp.

Figure 3 is a bottom plan view illustrating the device.

Figure 4 is a sectional view taken on the line 4—4 of Figure 3.

Figure 5 is a sectional view taken on the line 5—5 of Figure 1.

Referring in detail to the drawings, the numerals 1 and 2 indicate supporting elements of a clamp connected by a hinge 3 and also by an adjusting medium 4. The supporting members 1 and 2 are provided with recesses or chambers 5 of elongated formation closed by a removable cover 6. The chambers 5 open outwardly through the opposing faces of the supporting members and also have located therein guide blocks or elements 7 which form integral parts of the supporting members and the blocks 7 are provided on their opposing faces with removable wear strips 8 constructed of fibre or any other material suitable for the purpose. Pairs of pulleys 9 and 10 are journaled in the chambers of the supporting members and the pulleys 9 are located at opposite ends of the guide blocks 7 from the pulleys 10 and the latter-named pulleys are smaller in size than the pulleys 9 with their axles or journals arranged in alignment with the axles or journals of the pulleys 9. An endless gripping medium 11 is trained over the pulleys of each supporting member with the respective guide block 7 arranged between the runs of the gripping medium. The supporting members 1 and 2 when swung together arrange one run of each gripping medium opposite the corresponding run of the other gripping medium and receive therebetween a line or cable 12 and by tightening or adjusting the medium 4 the opposing runs of the endless gripping elements 11 will tightly grip the line or cable and thereby prevent slipping of the latter with respect to the clamp. By releasing the medium 4 the line or cable may be readily pulled through or adjusted with respect to the clamp, the endless gripping elements traveling over their respective pulleys, thereby reducing wear on said gripping elements as well as the line or cable and also changing the faces of the gripping elements upon the line or cable so that when the medium 4 is again adjusted to clamp the cable the newly presented faces of the gripping elements will tightly grip the line or cable. The wear plates 8 form backings for the active gripping runs of the gripping elements 11.

Each gripping element consists of a plurality of pivotally connected links 13 each link carrying a gripping portion 14, the outer face of which is concaved to receive the line or cable and said concaved face may be serrated if desired.

A hook 15 is formed integrally with one end of each supporting member to which may be applied a hoisting or supporting element or chain 16. The bill portion of each hook carries a set bolt 17 for the purpose of preventing the chain from becoming accidentally disengaged from the hook.

The hinges 3 are of the adjustable type whereby a limited adjustment of the members 1 and 2 towards and from each other may be accomplished.

Arms 18 are formed integrally with the members 1 and 2 upon the opposite sides thereof from the hinges and one of said arms is bifurcated to receive a headed bolt 19 and the bolt has threaded connection with a block 20 journaled in the bifurcated end of the other arm 18. A handle 21 is removably secured to the bolt for the purpose of rotating the latter to adjust the members 1 and 2 with respect to each other in cooperation with the adjustment provided by the hinges and also to permit the arms 18 to be detached from each other when desiring to open the members 1 and 2 or swing them upon the hinges to place in or remove a cable or line from the clamp.

From the foregoing description taken in connection with the accompanying drawings it will be seen that a very efficient clamp has been devised which may be easily and quickly applied or removed from the line and also may be easily adjusted to vary the gripping action of the clamp upon the line or cable and further the line or cable may be adjusted through the clamp without undue wear thereon or to the gripping mediums of the clamp by simply releasing the adjusting medium 4.

While I have shown and described the preferred embodiment of my invention, it will be understood that minor changes in construction, combination and arrangement of parts may be made without departing from the spirit and scope of my invention, as claimed.

Having described the invention, I claim:

A line clamp comprising a pair of members, hinges connecting said members for a limited adjustment towards and from each other, an adjustable clamp detachably connecting said members, said members having chambers opening outwardly through opposite walls thereof and providing in the chambers rigid guide blocks extending substantially the full length of said chambers, pairs of pulleys journaled to said members within the chambers and arranged at opposite ends of the blocks, wear plates removably secured to opposing faces of said blocks, endless flexible gripping elements trained over the pulleys with opposing runs thereof passing over and engaging with the wear plates, and covers removably secured to said members to close the major portions of the chambers and concealing one run of each flexible gripping element.

WILLIAM M. HANLON.